United States Patent
Moisan et al.

(10) Patent No.: US 11,551,572 B2
(45) Date of Patent: Jan. 10, 2023

(54) ADJUSTED-PROJECTION PANEL FOR ADDRESSING VERGENCE-ACCOMMODATION CONFLICT IN A DOME-TYPE SIMULATOR

(71) Applicant: CAE Inc., Saint-Laurent (CA)

(72) Inventors: Sylvain Moisan, Lachine (CA); Mathieu Gagnon, Deux-Montagnes (CA); Jean-Sébastien Dion, L'lle-Bizard (CA)

(73) Assignee: CAE Inc., Saint-Laurent (CA)

( * ) Notice: Subject to any disclaimer, the term of this patent is extended or adjusted under 35 U.S.C. 154(b) by 34 days.

(21) Appl. No.: 17/217,039

(22) Filed: Mar. 30, 2021

(65) Prior Publication Data
US 2022/0319349 A1    Oct. 6, 2022

(51) Int. Cl.
*G09B 9/30* (2006.01)
*G09B 9/32* (2006.01)

(52) U.S. Cl.
CPC .............. *G09B 9/301* (2013.01); *G09B 9/32* (2013.01)

(58) Field of Classification Search
CPC ... G09B 9/02; G09B 9/08; G09B 9/30; G09B 9/302
See application file for complete search history.

(56) References Cited

U.S. PATENT DOCUMENTS

| | | | |
|---|---|---|---|
| 4,350,489 A | 9/1982 | Gdovin | |
| 5,137,348 A | 8/1992 | Lacroix | |
| 5,320,534 A * | 6/1994 | Thomas | G09B 9/307 348/121 |
| 5,746,599 A * | 5/1998 | Lechner | G09B 9/302 434/38 |
| 2014/0368497 A1 | 12/2014 | Vogelmeier et al. | |
| 2019/0250332 A1 * | 8/2019 | Cippant | G03B 37/04 |

FOREIGN PATENT DOCUMENTS

| | | |
|---|---|---|
| EP | 0402479 A1 | 12/1990 |
| WO | 2011/149140 A1 | 12/2011 |

OTHER PUBLICATIONS

Extended European Search Report from EP Application No. 22163045.2 dated Nov. 8, 2022.

* cited by examiner

*Primary Examiner* — Timothy A Musselman
(74) *Attorney, Agent, or Firm* — Gowling WLG (Canada) LLP

(57) ABSTRACT

An interactive computer simulation system includes one or more processors for performing an interactive computer simulation in an interactive simulated environment based on user input and for generating images related to the interactive computer simulation. The system includes a dome for displaying the images, the dome being cut by a base below an equatorial plane of the dome, the images being displayed on the dome at a general-projection distance. The system further includes an adjusted-projection panel having an adjusted-projection surface defining an adjusted-projection distance smaller than the general-projection distance for addressing a vergence-accommodation conflict when simulated ground images are displayed.

25 Claims, 10 Drawing Sheets

ADJUSTED-PROJECTION PANEL FOR ADDRESSING VERGENCE-ACCOMMODATION CONFLICT IN A DOME-TYPE SIMULATOR

CROSS-REFERENCE TO RELATED APPLICATIONS

This is the first patent application filed for the present invention.

TECHNICAL FIELD

The present invention relates to simulators and, more particularly, to dome-type simulators.

BACKGROUND

In dome-type simulators, such as dome-type flight simulators, a vergence-accommodation conflict arises due to the difference between the distance to a virtual object being displayed in simulated imagery on a dome and the focusing distance to the surface of the dome on which the imagery is projected. In a dome-type simulator, the eyes of the viewer accommodate to the fixed distance of the dome yet verge to the perceived distance of the virtual object that is being displayed. This conflict between accommodation and vergence frequently can cause eyestrain and disorientation and can deleteriously affect the viewer's perception of the virtual object.

The dome-type simulator is typically designed to enable the viewer's eyes to focus and converge on the dome surface at a comfortable viewing distance that provides good close-range depth perception. However, during landings, this can create a misleading cue that the ground is too far away for small aircraft, such as for example helicopters. In other words, there is a discrepancy between the real-world distance to the ground and the perceived distance to the simulated ground in the simulated environment increases. The discrepancy hinders training for maneuvers such as landing or hovering because the viewer's perception of the distance to the ground is inaccurate.

A simulator that addresses this technical issue is highly desirable.

SUMMARY

In general, an interactive computer simulation system is a dome-type simulator having a dome upon which images are projected. The system includes an adjusted-projection panel mounted or connected to the dome. The adjusted-projection panel includes an adjusted-projection surface defining an adjusted-projection distance smaller than a general-projection distance of the dome. This system addresses a vergence-accommodation conflict, particularly in relation to images of the ground or other lower ground-like feature such as a helipad, treetops or expanse of water. The images of the ground or other lower ground-like feature are projected onto the adjusted-projection panel so that these images of the ground or ground-like feature are perceived to be closer to the real-world distance to the ground or ground-like feature, thus providing a more accurate simulation.

Accordingly, an inventive aspect of the present disclosure is an interactive computer simulation system that includes one or more processors for performing an interactive computer simulation in an interactive simulated environment based on user input and for generating images related to the interactive computer simulation. The system includes a dome for displaying the images, the dome being cut by a base below an equatorial plane of the dome, the images being displayed on the dome at a general-projection distance. The system further includes an adjusted-projection panel having an adjusted-projection surface defining an adjusted-projection distance smaller than the general-projection distance for addressing a vergence-accommodation conflict when simulated ground images are displayed.

Another inventive aspect of the disclosure is a kit that includes at least one display panel having an adjusted-projection surface to address the vergence-accommodation conflict relative to the general-projection surface of the dome when simulated ground or ground-like images are displayed on the adjusted-projection panel. The kit also includes at least one connector for detachably mounting the adjusted-projection panel onto the dome at an adjusted-projection distance that is smaller than the general-projection distance.

Yet another inventive aspect of the disclosure is a method of addressing a vergence-accommodation conflict arising from images displayed in a dome-type simulator that simulates a simulated vehicle in an interactive simulated environment, the dome-type simulator having a dome cut by a base below an equatorial plane. The method entails generating the images related to the simulated vehicle in the interactive simulated environment based on user input received from a user at a user station located within the dome. The method also entails displaying the images both on a general-projection surface of the dome at a general-projection distance from the user station and on an adjusted-projection panel having an adjusted-projection surface at an adjusted-projection distance from the user station, the adjusted-projection panel being located between the base and the equatorial plane, the adjusted-projection distance being smaller than the general-projection distance for addressing the vergence-accommodation conflict when simulated ground or ground-like images are displayed on the adjusted-projection panel.

Another aspect of the disclosure is a method of manufacturing a display panel for addressing a vergence accommodation-conflict in images that are projected from an interactive computer simulation of a simulated vehicle in an interactive simulated environment. The method entails determining a diameter and a curvature of a dome onto which the images are to be projected, determining a geometry of the display panel based on the diameter and the curvature of the dome, manufacturing the display panel based to match the geometry. The display panel may be detachably mounted to the dome.

Another aspect of the disclosure is a method of configuring an interactive computer simulation of a simulated vehicle in an interactive simulated environment in which images are projected onto a dome. The method entails detachably mounting an adjusted-projection panel in the dome, adjusting a distance of the adjusted-projection panel relative to an observation station within the dome and/or adjusting an angle of the adjusted-projection panel relative to the observation station within the dome.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Further features and exemplary advantages of the present invention will become apparent from the following detailed description, taken in conjunction with the appended drawings, in which.

DETAILED DESCRIPTION

Disclosed herein are various embodiments of an interactive computer simulation system, also referred to herein simply as a "simulation system", that projects images of an interactive simulated environment on one or more displays to enable a user (e.g., a pilot, trainee, or other user) to train or learn to control a simulated vehicle in the interactive simulated environment. The simulation system may be a flight simulator that simulates an aircraft, either a fixed-wing aircraft or a rotary-wing aircraft. The simulation system may simulate another type of vehicle, including land-based vehicles or water-based vehicles. The simulation system may also be a non-vehicle simulator providing an immersive virtual-reality environment for training or gaming.

In the illustrated embodiments, the simulation system is a dome-type simulator having a dome upon which images are projected. In the illustrated embodiments, the dome has a curved interior surface, which may be spherical or substantially spherical in shape. Images are projected onto the dome to provide an immersive visual experience for the user. The user is positioned inside the dome at a user station or observation station. The station may include a seat and tangible instrumentation and controls (e.g., yoke, throttle levers, etc.) to enable the user to provide user input to the simulator to control the simulated vehicle in the interactive simulated environment. For example, the user may be a pilot and the user station may be a cockpit having a seat and aircraft controls for a fixed-wing aircraft or a rotary-wing aircraft. As will be explained in greater detail below the simulation system includes an adjusted-projection surface mounted or connected to the dome. The adjusted-projection surface defines an adjusted-projection distance smaller than a general-projection distance of the dome. This system addresses a vergence-accommodation conflict, particularly in relation to images of the ground. The images of the ground are projected onto the adjusted-projection surface so that these images of the ground are perceived to be closer to the real-world distance to the ground, thus providing a more accurate simulation.

Figure 1:
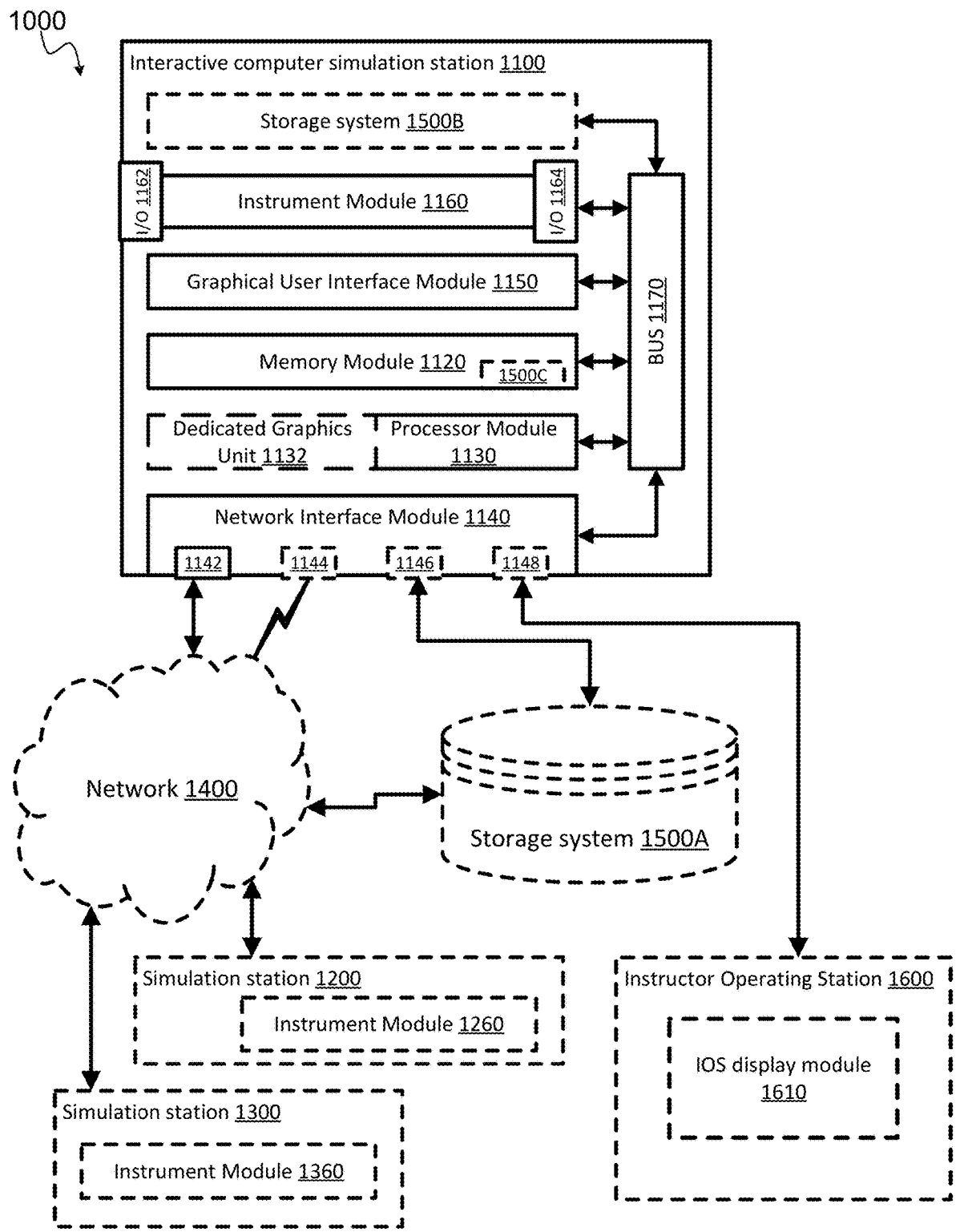
FIG. 1 is a schematic view of an interactive computer simulation system for implementing an embodiment of the present invention.

Reference is now made to the drawings in which FIG. 1 shows a logical modular view (or schematic depiction) of an exemplary interactive computer simulation system 1000 (also referred to herein as simply the "simulation system") in for implementing embodiments of the present invention. The simulation system 1000 performs one or more interactive computer simulations. Each interactive computer simulation comprises one or more virtual simulated elements each representing an actual system (e.g., multiple virtual aircraft systems each representing an actual aircraft). Each interactive computer simulation provides a virtual environment and various tangible instruments (or controls) to allow enactment of different scenarios for the purpose of training one or more users (or trainees), using one or more of the virtual simulated elements, in the operation and/or understanding of the corresponding one or more actual systems. The virtual simulated element, or simulated element, is defined herein as a simulated system, and may further comprise multiple simulated dynamic subsystems, or dynamic subsystems. The simulated element is a virtual version that simulates, to the extent required by the interactive computer simulation, behavior of an actual system. Correspondingly, each of the simulated dynamic subsystems of the simulated element is a virtual version, to the extent required by the interactive computer simulation, behavior of actual subsystems of the actual system.

In the embodiment depicted in FIG. 1, the simulation system 1000 comprises an interactive computer simulation station 1100 for controlling at least one of the virtual simulated elements from the computer simulation executed on the simulation system 1000. The simulation system 1000 typically comprises multiple simulation stations (not shown) that each allow one or more users to interact to control a virtual simulated element in one of the interactive computer simulation(s) of the simulation system 1000. The simulation system 1000 also comprises an Instructor Operating Station (IOS) 1600 having an IOS display module 1610.

In the example depicted in FIG. 1, the simulation station 1100 is a distinct simulation station while, in some embodiments, the simulation station 1100 may be integrated with one or more of the simulation stations. Various network links may be implicitly or explicitly used in the context of the present invention. While a link may be depicted as a wireless link, it could also be embodied as a wired link using a coaxial cable, an optical fiber, a category 5 cable, and the like. A wired or wireless access point (not shown) may be present on links. Likewise, any number of routers and/or switches (not shown) may be present on links, which may further transit through the Internet.

In the example depicted in FIG. 1, the interactive computer simulation station 1100 comprises a memory module 1120, a processor module 1130 and a network interface module 1140. The processor module 1130 may represent a single processor with one or more processor cores or an array of processors, each comprising one or more processor cores. In some embodiments, the processor module 1130 may also comprise a dedicated graphics processing unit 1132. The dedicated graphics processing unit 1132 may be required, for instance, when the simulation system 1000 performs an immersive simulation (e.g., pilot training-certified flight simulator), which requires extensive image generation capabilities (i.e., quality and throughput) to maintain expected realism of such immersive simulation.

The memory module 1120 may comprise various types of memory (different standardized or kinds of Random Access Memory (RAM) modules, memory cards, Read-Only Memory (ROM) modules, programmable ROM modules, etc.). The network interface module 1140 represents at least one physical interface that can be used to communicate with other network nodes. The network interface module 1140 may be made visible to the other modules of the simulation station 1100 through one or more logical interfaces. The actual stacks of protocols used by the physical network interface(s) and/or logical network interface(s) 1142, 1144, 1146, 1148 of the network interface module 1140 do not affect the teachings of the present invention. The variants of processor module 1130, memory module 1120 and network interface module 1140 usable in the context of the present invention will be readily apparent to persons skilled in the art.

A bus 1170 is depicted as an example of means for exchanging data between the different modules of the simulation station 1100. The present invention is not affected by the way the different modules exchange information between them. For instance, the memory module 1120 and the processor module 1130 could be connected by a parallel bus 1170, but could also be connected by a serial connection or involve an intermediate module (not shown) without affecting the teachings of the present invention.

Likewise, even though explicit mentions of the memory module 1120 and/or the processor module 1130 are not made throughout the description of the various embodiments, persons skilled in the art will readily recognize that such modules are used in conjunction with other modules of the simulation station 1100 to perform routine as well as innovative steps related to the present invention.

The simulation system 1000 comprises a storage system 1500A-C for, among other aspects, collecting dynamic data in relation to the dynamic system and dynamic subsystems while the interactive computer simulation is performed. FIG. 1 shows examples of the storage system 1500A-C as a distinct database system 1500A, a distinct module 1500B of the computer system 1110, and a sub-module 1500C of the memory module 1120 of the simulation station 1100. The storage system 1500A-C may comprise one or more logical or physical as well as local or remote hard disk drive (HDD) (or an array thereof). The storage system 1500A-C may further comprise a local or remote database made accessible to the simulation station 1100 by a standardized or proprietary interface or via the network interface module 1140 (e.g., cloud-based storage service). In some embodiments, the storage system 1500A-C stores the dynamic data and/or the processed/converted data in a cloud-based storage service. The variants of storage system 1500A-C usable in the context of the present invention will be readily apparent to persons skilled in the art.

The interactive computer simulation station 1100 may comprise a graphical user interface (GUI) module 1150 that may be used to visualize virtual dynamic subsystems from the virtual simulated element. The GUI module 1150 may comprise one or more display screens such as a wired or wireless flat screen, a wired or wireless touch-sensitive display, a tablet computer, a portable computer or a smart phone.

Users of the simulation system 1000 (e.g., users of the simulation stations 1100) interact in the interactive computer simulation to control a virtual simulated element in a computer-generated environment of the simulation system 1000 (e.g., instructors or experts, trainees such as a pilot and co-pilot, a driver, an operator, a surgeon, a flight investigator, a training analyst, a flight analyst, etc.). Examples of virtual simulated elements include a simulated aircraft system, a simulated land vehicle system, a simulated spacecraft or space station system, a simulated control room system, unmanned vehicle or drone, a simulated human mannequin, etc. Examples of virtual dynamic subsystems vary depending on the virtual simulated element. In the example of a simulated aircraft system, typical virtual dynamic subsystems may include virtual hydraulic systems, virtual communication systems, virtual display systems, virtual wiring systems, virtual in-flight entertainment systems, virtual fuel systems, virtual lighting systems, virtual rudder system, virtual flap system, virtual landing gear system, etc. In the example of a simulated living system, typical virtual dynamic subsystems may include blood system, digestive system immunity response system, lymphatic system, nervous system, biometric data such as temperature, blood pressure and other related physical data, etc. When a trainee or user is involved, actual measurements of biometric data may also be recorded (e.g., for subsequent correlation with other recorded data). For instance, biometric data from a pilot interacting in a computer simulation with one or more tangible instruments at the simulation station 1100 may be recorded (such as temperature, blood pressure and other related physical data). As a skilled person would appreciate, most virtual subsystems are directly or indirectly affected by interactions of the user with one or more tangible instruments that allow the user to interact (e.g., provide different commands in order to control the virtual simulated element) during the interactive computer system in the computer-generated environment. Some other virtual subsystems may be affected by time elapsed during the interactive computer system and may further take into account the interactions of the user with one or more tangible instruments. For instance, in the example of a simulated aircraft system, a virtual aircraft structure subsystem may comprise one or more virtual mechanical components. Failure of any one of virtual mechanical components, or the virtual aircraft structure subsystem altogether, may be based on accumulated mechanical stress considering use time (e.g., number of flights and operating hours) and also based on maneuvers caused by the pilot manipulating the one or more tangible instruments.

The tangible instrument provided by the instrument modules 1160 are tightly related to the element being simulated. In the example of the simulated aircraft system, typical instruments include various switches, levers, pedals and the like accessible to the user for controlling the aircraft in the interactive computer simulation. Depending on the type of simulation (e.g., level of immersivity), the tangible instruments may be more or less realistic compared to those that would be available in an actual aircraft. For instance, the tangible instrument provided by the module 1160 may replicate an actual aircraft cockpit where actual instruments found in the actual aircraft or physical interfaces having similar physical characteristics are provided to the user (or trainee). As previously described, the actions that the user or trainee takes with one or more of the tangible instruments provided via the instrument module 1160 (modifying lever positions, activating/deactivating switches, etc.) allow the user or trainee to control the virtual simulated element in the interactive computer simulation. In the context of an immersive simulation being performed in the simulation system 1000, the instrument module 1160 would typically support a replica of an actual instrument panel found in the actual system being the subject of the immersive simulation. In such an immersive simulation, the dedicated graphics processing unit 1132 would also typically be required. While the present invention is applicable to immersive simulations (e.g., flight simulators certified for commercial pilot training and/or military pilot training), skilled persons will readily recognize and be able to apply its teachings to other types of interactive computer simulations.

In some embodiments, an optional external input/output (I/O) module 1162 and/or an optional internal input/output (I/O) module 1164 may be provided with the instrument module 1160. Skilled people will understand that any of the instrument modules 1160, 1260 and/or 1360 may be provided with one or both of the I/O modules such as the ones depicted for the computer system 1000. The external input/output (I/O) module 1162 of the instrument module 1160, 1260 and/or 1360 may connect one or more external tangible instruments (not shown) therethrough. The external I/O module 1162 may be required, for instance, for interfacing the simulation system 1000 with one or more tangible instruments identical to an Original Equipment Manufacturer (OEM) part that cannot be integrated into the simulation system 1000 (e.g., a tangible instrument exactly as the one that would be found in the actual system subject of the interactive simulation). The internal input/output (I/O) module 1164 of the instrument module 1160 may connect one or more tangible instruments integrated with the instrument module 1160. The internal I/O module 1164 may comprise necessary interface(s) to exchange data, set data or get data from such integrated tangible instruments. The internal I/O module 1164 may be required, for instance, for interfacing the simulation system 1000 with one or more integrated tangible instrument identical to an Original Equipment Manufacturer (OEM) part (e.g., a tangible instrument exactly as the one that would be found in the actual system subject of the interactive simulation).

In some embodiments, a simulation plan may further be loaded (not shown) from the storage system 1500A-C in relation the interaction computer simulation that involves the virtual simulated element. The simulation plan may comprise a training plan, a lesson plan or a scenario-based plan (e.g., with specific or dynamic objectives to be reached). The simulation plan may also be used alternatively or additionally to set the period of time covering simulated events from the interactive computer simulation related to the selected virtual subsystem.

The simulation system 1000 is typically used to train personnel for complex and/or risky operations. Each interactive computer simulation provides a virtual environment and various tangible instruments (or controls) to allow enactment of different scenarios for the purpose of training one or more users (or trainees), using one or more of the virtual simulated elements, in the operation and/or understanding of the corresponding one or more actual systems. In some situations, real-life training is simply not possible because the target scenario cannot be enacted safely in real life (e.g., military mission, rescue mission, medical treatment or operation, etc.). In other situations, it is impractical and/or too costly to enact the training scenario in real life. The simulation system 1000 alleviates the risks and allows for repeated training. The simulation system 1000 also limits the overall costs of training when compared to real-life training.

Figure 2:
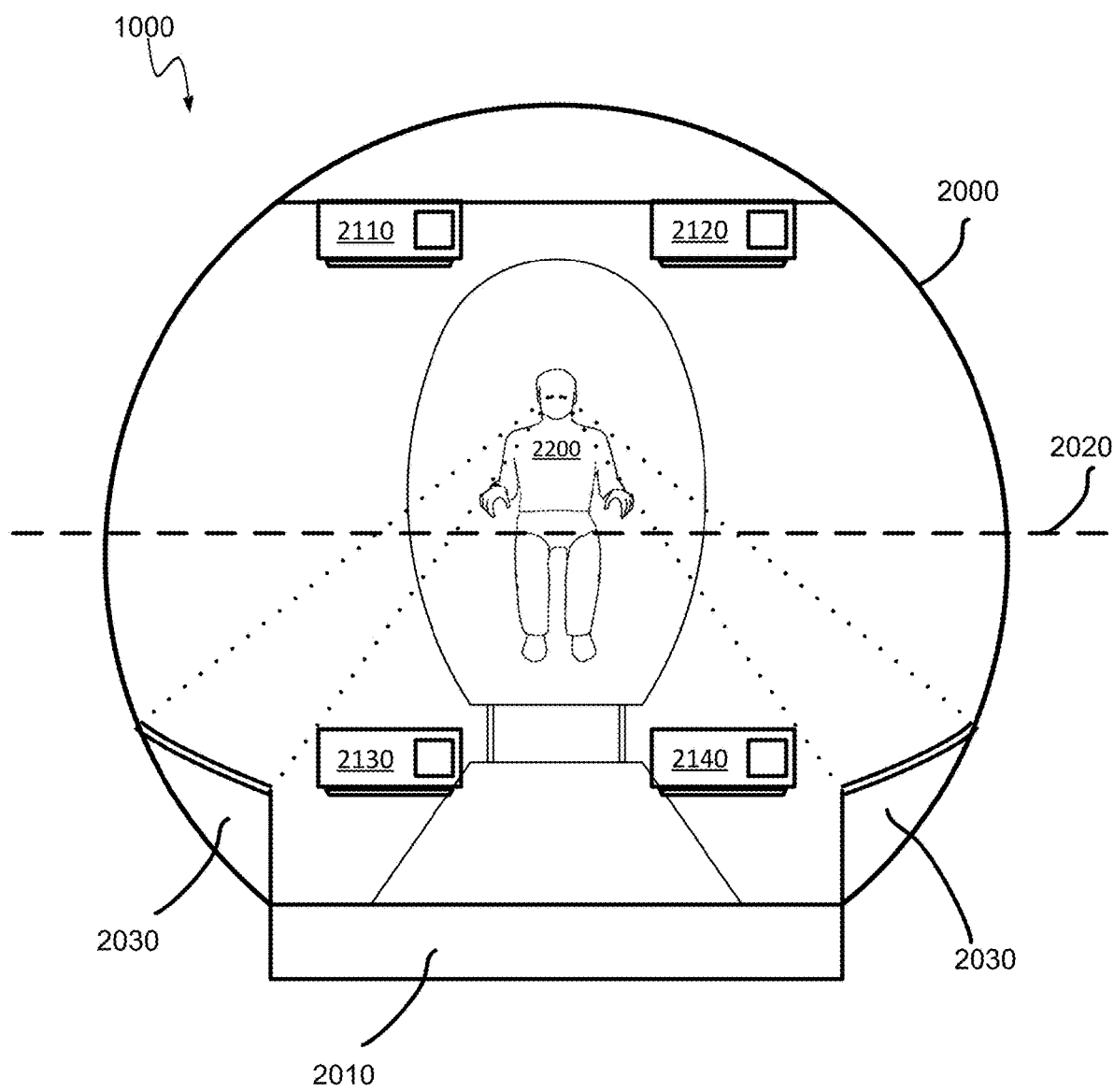
FIG. 2 is a front view of a dome-type simulator in accordance with an embodiment of the present invention.

In one embodiment of the present invention, as depicted in FIG. 1 and FIG. 2, the simulation system 1000 includes one or more processors (e.g., processor module 1130) for performing an interactive computer simulation in an interactive simulated environment based on user input and for generating images related to the interactive computer simulation. The simulation system 1000 includes a dome 2000 for displaying the images, the dome 2000 being cut by a base 2010 below an equatorial plane 2020 of the dome 2000. The images are displayed on the dome 2000 by one or more projectors 2110, 2120, 2130, 2140 at a general-projection distance for viewing by the user (e.g., trainee or pilot) 2200. The general-projection distance is defined as the distance from the user, when positioned at a user station or observation stations within the dome, to the inner surface of the dome 2000 where the images are projected. The simulation system 1000 includes an adjusted-projection panel 2030 having an adjusted-projection surface defining an adjusted-projection distance that is smaller than the general-projection distance. The adjusted-projection panel addresses a vergence-accommodation conflict when simulated ground images or images of ground-like features are displayed. For the purpose of this specification, the expression "ground-like feature" for a rotorcraft includes surfaces, objects or structures, whether manmade or naturally occurring, such as a helipad on a ship or on a roof of a building, an expanse of water, treetops or the like. In the context of a spacecraft simulation system, the "ground-like surface" may be a portion of a space station or other spacecraft. The ground images or ground-like images, without the adjusted-projection panel 2030, give the user an inaccurate perception of the distance to the ground or ground-like feature. With the adjusted-projection panel 2030, a more accurate perception of the distance to the ground or ground-like feature is provided to the user. The system may include a single adjusted-projection panel 2030 or a plurality of adjusted-projection panels. As depicted in FIG. 2, the adjusted-projection panel is located above the base 2010 and below the equatorial plane 2020 of the dome 2000. In this specific embodiment, the adjusted-projection panel 2030 has a lower edge that contacts the base 2010 and an upper edge that is spaced below the equatorial plane 2020 by a gap. The geometry of the dome 2000, the base 2010, the equatorial plane 2020 and the adjusted-projection panel 2030 is depicted in FIG. 3.

Figure 4:
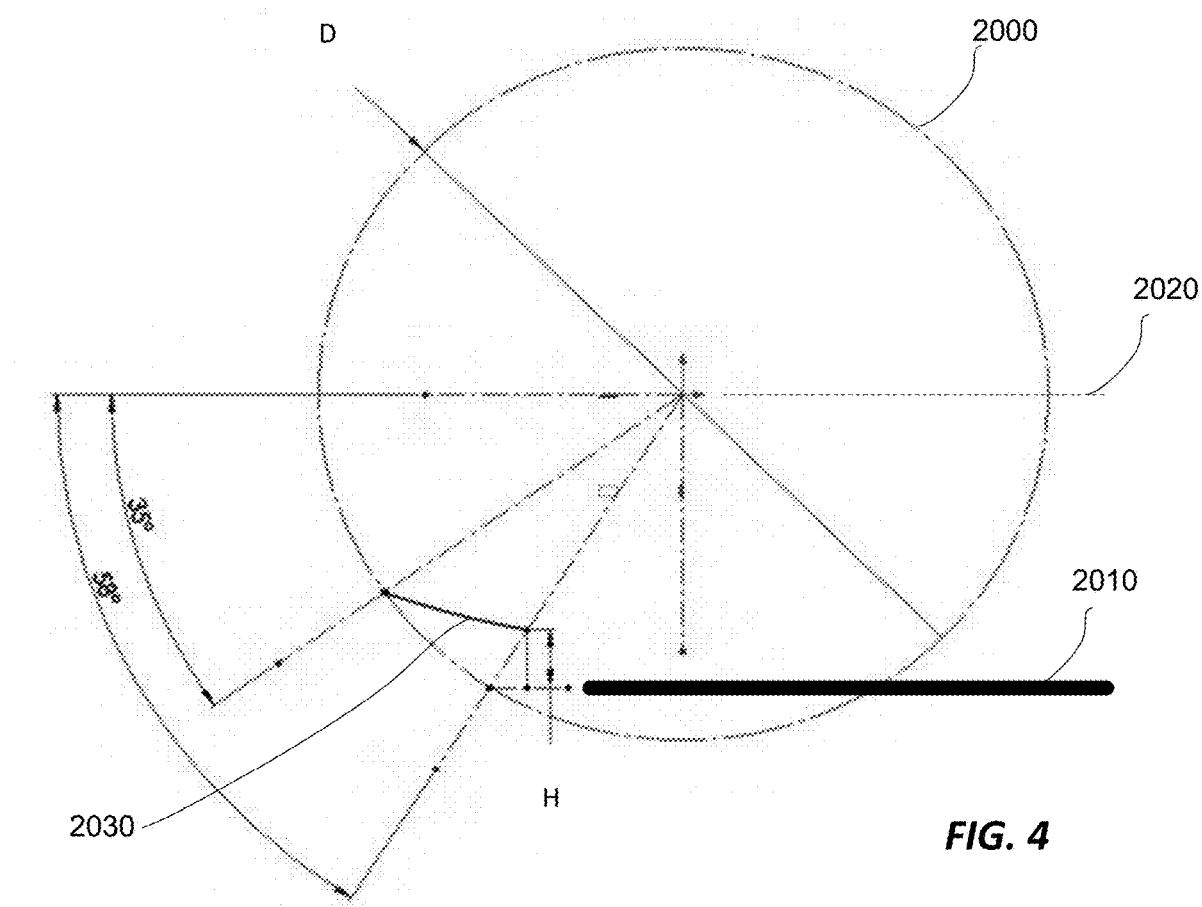
FIG. 4 is a side view of a dome-type simulator showing the geometry of one exemplary implementation of an adjusted-projection panel in accordance with one embodiment of the present invention.

FIG. 4 depicts a specific exemplary implementation of the dome 2000. Solely to illustrate one specific implementation, the dome may have a diameter D which may be, for example, 288 inches. The adjusted-projection surface in this specific implementation has a height H which may be, for example, 23-25 inches. The adjusted-projection panel may be sized to reduce the distance relative to the user or the user's observation station by 23-25 inches.

More specifically, the height may be, for example, 24 inches. In this example geometry, the adjusted-projection panel 2030 spans an arc of −58 degrees to −35 degrees measured from the equatorial plane 2020 as shown in FIG. 4. The dimensions shown in FIG. 4 are solely presented as one example implementation and shall not be construed as limiting the invention. It is therefore understood that the geometry, dimensions and proportions of the dome 2000 and the adjusted-projection panel 2030 may be varied to achieve the same or substantially similar results.

Figure 3:
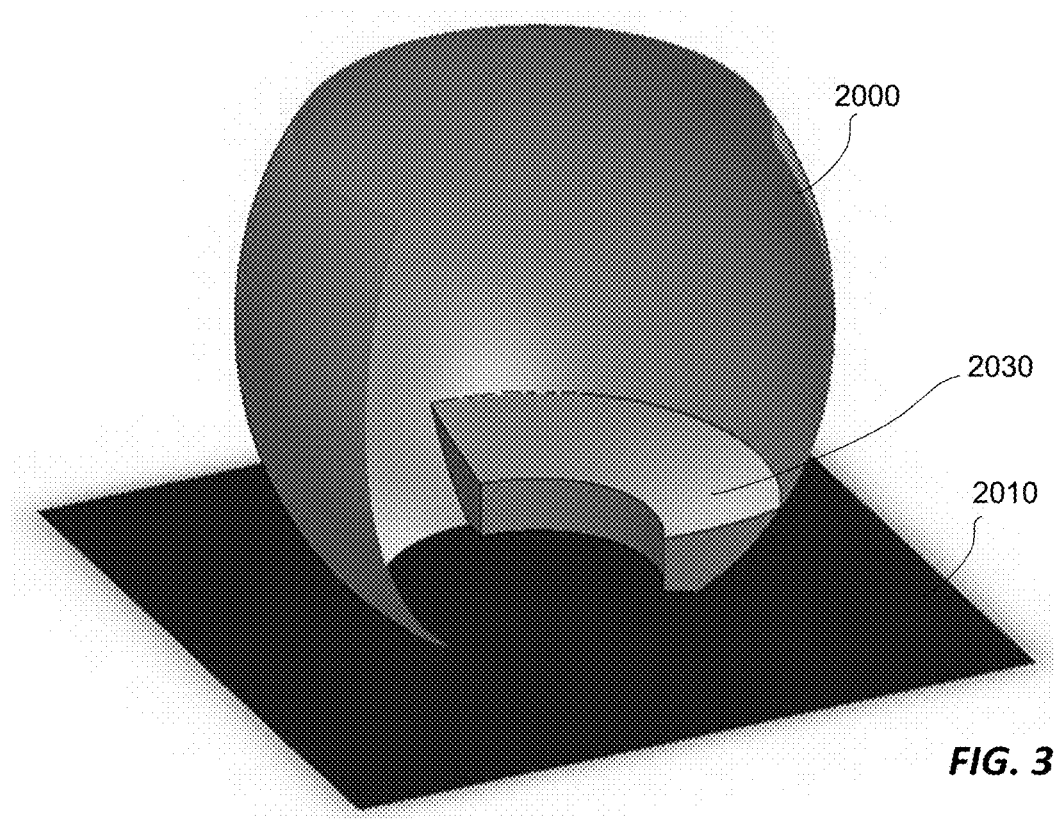
FIG. 3 is an isometric cutaway view of a dome-type simulator having a dome, a base and an adjusted-projection panel.

As depicted by way of example in FIG. 2 to FIG. 4, the dome 2000 has a first curvature (first radius of curvature) and the adjusted-projection panel has a second curvature (second radius of curvature) that is different than the first curvature. Specifically, the first radius of curvature is larger than the second radius of curvature. In the illustrated embodiments, the dome 2000 has a spherical inner surface defining a uniform radius of curvature. In a variant, the radius of curvature of the dome 2000 may vary, i.e., the inner surface may be spheroidal or even aspherical. Alternatively, the dome 2000 may have a spherical or spheroidal portion and an aspherical portion. Analogously, although the adjusted-projection panel 2030 may define an adjusted-projection surface that is spherical or spheroidal, in a variant it may be aspherical or be composed of a spherical or spheroidal portion and an aspherical portion. In another embodiment, the adjusted-projection panel 2300 defines an adjusted-projection surface that is planar.

Figure 5:
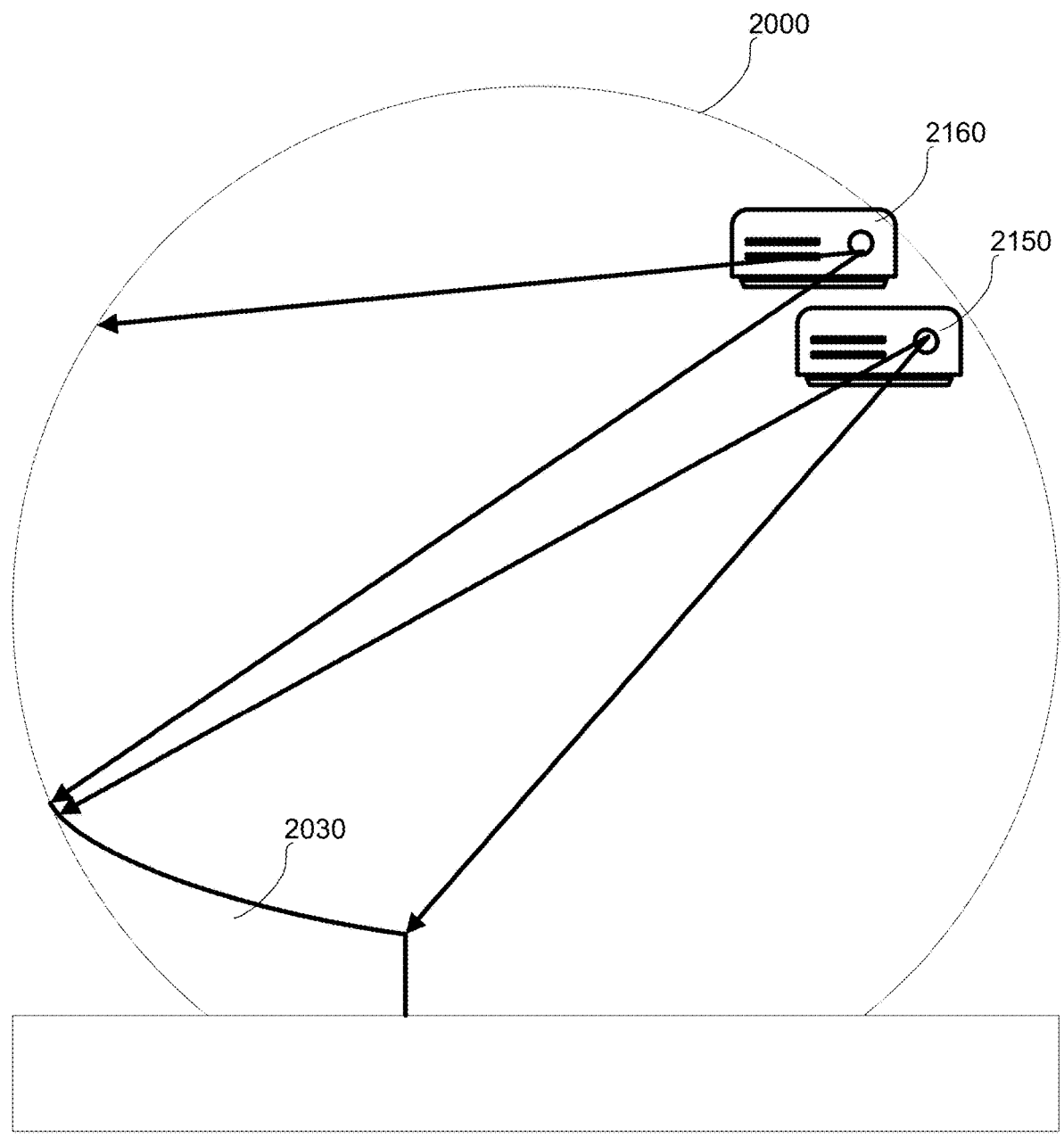
FIG. 5 is a side view of a dome-type simulator having a plurality of projectors, one of which is a dedicated projector for projecting images on the adjusted-projection panel.

As introduced above with regard to FIG. 2, the simulation system 1000 includes a plurality of projectors for projecting the images on the dome 2000 and the adjusted-projection surface on the adjusted-projection panel 2030. For the sake of illustration, as shown in FIG. 2, the simulation system 1000 includes four projectors, namely projectors 2110, 2120, 2130 and 2140. In FIG. 5, the plurality of projectors optionally includes a dedicated projector 2150 for projecting simulated ground or ground-like images on the adjusted-projection panel 2030. The simulation system 1000 may include a dome projector 2160 that projects images only on the dome 2000. In the specific implementation involving ground or ground-like images, the simulation system 1000 may have a plurality of projectors for projecting the images onto the dome 2000 and the adjusted-projection panel 2030 where, optionally, a subset of the plurality of projectors is dedicated to projecting lower portions of the images (i.e., ground or ground-like images) onto the adjusted-projection panel 2030.

In the embodiment of FIG. 5, the projectors 2150, 2160 may be movable to vary the adjusted-projection distance or alternatively, they may be fixed and have adjustable lenses to vary the adjusted-projection distance.

Figure 6:
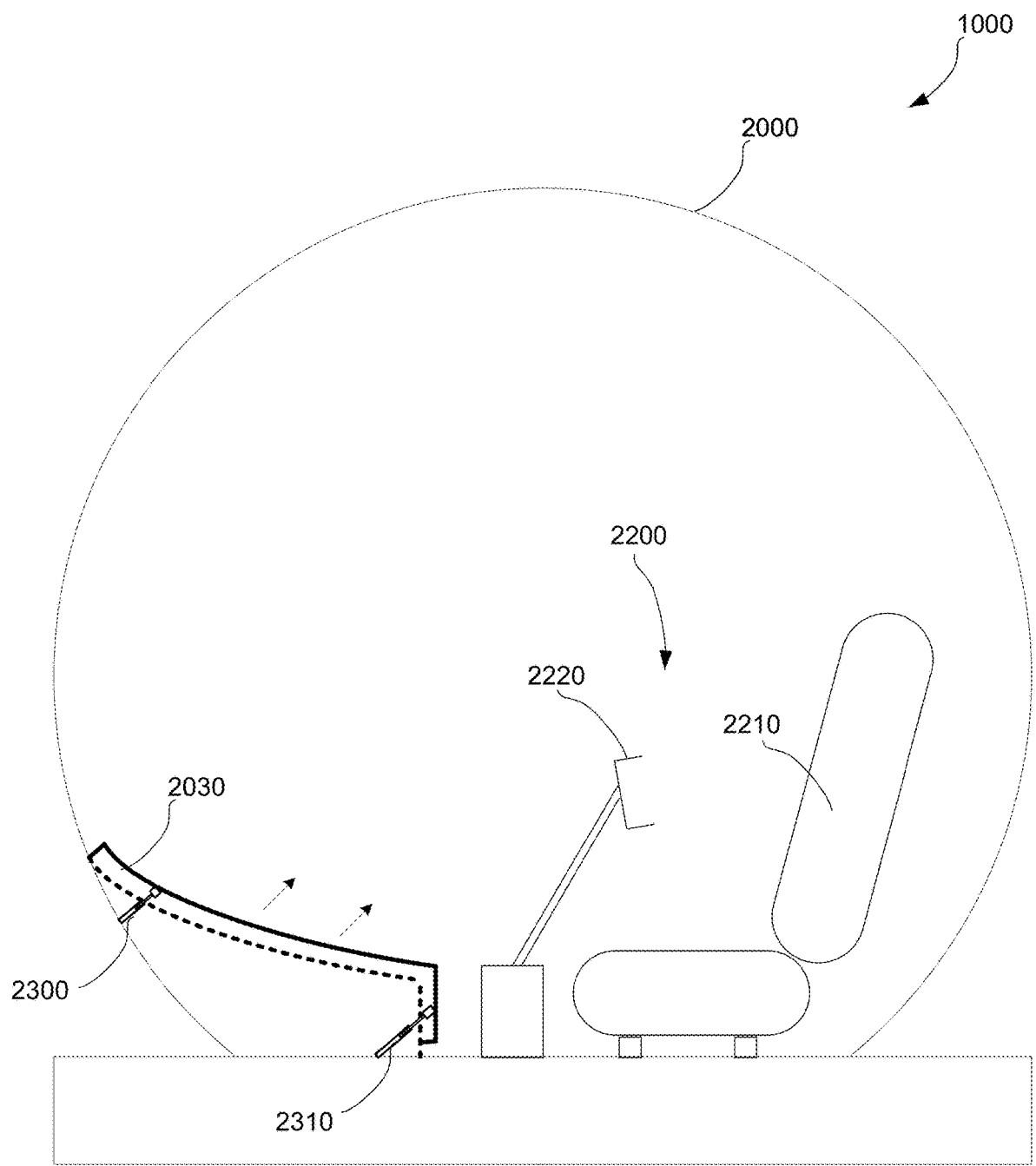
FIG. 6 is a side view of a dome-type simulator having actuators for moving the adjusted-projection panel.

As depicted by way of example in FIG. 6, the simulation system 1000 includes a user station 2200 (or observation station) that is disposed inside the dome 2000. The general-projection distance and the adjusted-projection distance may be defined using a position of the user station 2200 as a reference point. As further depicted in FIG. 6, the user station 2200 comprises a seat 2210 for the user and tangible instruments (controls) 2220 to receive the user input from the user during the interactive computer simulation. The tangible instrumentation may include a yoke, throttle lever, rudder pedals, buttons, switches, knobs, toggles, touch-screen input devices, or any other physical control devices to control the simulated vehicle in the simulation.

As further depicted in FIG. 6, the simulation system 1000 may include a movable surface or adjustable panel that is movable or adjustable relative to the reference point to variably address the vergence-accommodation conflict for different simulations, different simulated vehicles and/or for different images. In the example of FIG. 6, the adjusted-projection panel 2030 is selectively movable in the dome 2000. Alternatively, in another embodiment, the adjusted-projection panel 2030 is fixed within the dome 2000 at the adjusted-projection distance.

The adjusted-projection panel 2030 may be mounted to a translating mechanism to linearly displace (translate) the adjusted-projection panel 2030. The translating mechanism may include one or more actuators connected to the adjusted-projection panel (e.g., first and second actuators 2300, 2310) to linearly displace the adjusted-projection panel 2030. The translating mechanism is controlled by the processor module 1130 to move the adjusted-projection panel 2030 to vary the adjusted-projection distance in order to address the vergence-accommodation conflict. In various embodiments, the adjusted-projection panel 2030 may be movable between the adjusted-projection distance and the general-projection distance depending on the nature of the images to be projected. If the images include close-range ground or ground-like images, the adjusted-projection panel 2030 is moved to the adjusted-projection distance.

Movement of the adjusted-projection panel 2030 may be done automatically (programmatically) or manually in response to a command or input. For example, the adjusted-projection panel 2030 may be moved by the translating mechanism in response to a command from an Instructor Operating Station (IOS) 1600 associated with the interactive computer simulation system. As a further example, the adjusted-projection panel 2030 may be moved automatically in response to changes in the simulation such as, for example, when ground or ground-like images are displayed at close range. As noted earlier, due to the vergence-accommodation conflict, the user may perceive these close-range ground or ground-like images inaccurately. Thus, when the simulated vehicle is within a predetermined distance of the simulated ground or ground-like feature, for example, the adjusted-projection panel 2030 is moved to the adjusted-projection distance to address the vergence-accommodation conflict. For example, the translating mechanism may move the adjusted-projection panel 2030 when a simulated vehicle is within a simulated landing-range distance from a simulated ground or ground-like feature in the interactive simulated environment. As another example, the translating mechanism may move the adjusted-projection panel 2030 from the general-projection distance to the adjusted-projection distance as the simulated vehicle reaches the simulated landing-range distance from the simulated ground or ground-like feature in the interactive simulated environment. As a further example, the translating mechanism may move the adjusted-projection panel 2030 from the adjusted-projection distance to the general-projection distance when the simulated vehicle moves beyond a simulated liftoff-range distance from the simulated ground or ground-like feature in the interactive simulated environment.

In one embodiment, the simulation system 1000 is configured to pre-emptively commence movement of the adjusted-projection panel 2030 before reaching the simulated liftoff-range distance or the simulated landing-range distance. Alternatively, in another embodiment, the simulation system 1000 is configured to pre-delay movement of the adjusted-projection surface before reaching the simulated liftoff-range distance or the simulated landing-range distance.

In one embodiment of the simulation system 1000, the adjusted-projection surface is a removable panel that is detachably mounted to the dome 2000. The removable panel may be mounted by one or more connectors. The connectors may include fasteners, brackets or the like to mechanically attach the removable panel to the dome.

In one embodiment of the simulation system 1000, the adjusted-projection surface 2030 is composed of a plurality of continuous displaying surfaces defined by a plurality of removable panels mounted to the dome 2000.

Figure 7:
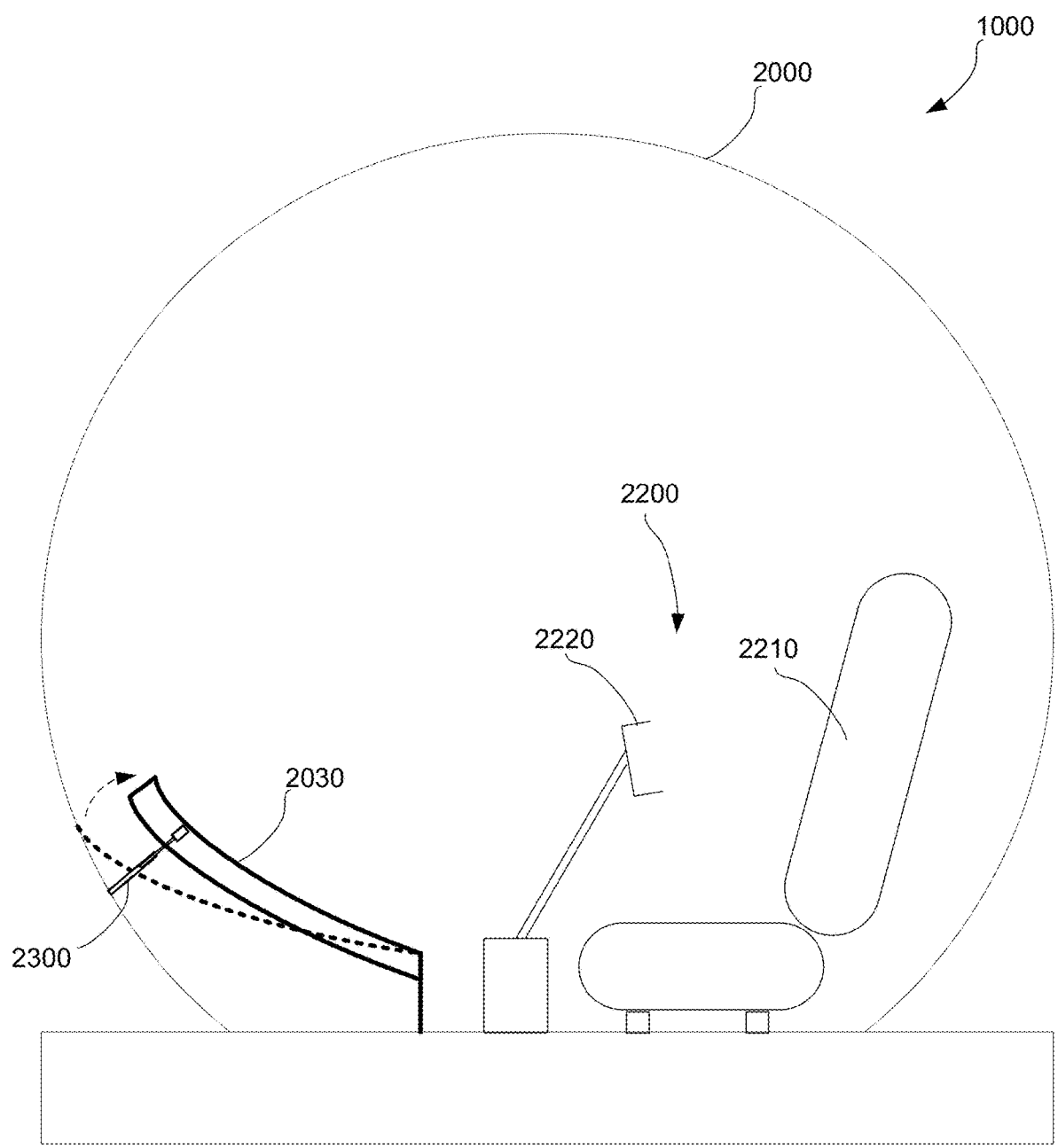
FIG. 7 is a side view of a dome-type simulator having actuators for tilting the angle of the adjusted-projection panel.

As depicted by way of example in FIG. 7, the simulation system 1000 has a translating mechanism (e.g., actuator 2300) connected to the adjusted-projection panel 2030 to vary an angle of the adjusted-projection panel 2030. This enables the adjusted-projection panel 2030 to be tilted. It will be appreciated that the adjusted-projection panel 2030 may be both displaced linearly and tilted in a further embodiment. The extremity or edge of the panel (insert) abutting the internal surface of the dome can be made from a deformable material that can accommodate rotational or translational movements of the panel (insert) without compromising reflectance properties. The extremity can, for instance, be fabricated by overlaying an enamel or acrylic on a piece of latex or other equivalent stretchable material. A coating would be applied on the enamel to provide for the desired reflectance properties. The coating maintains its reflectance properties as long as it stays within its tensile limits over the course of the deformations.

Figure 8:
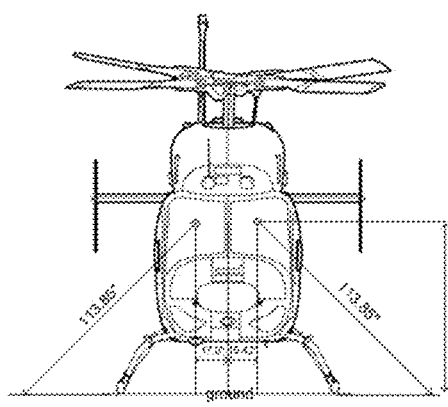
FIG. 8 is a front view of a helicopter to be simulated.
Figure 9:
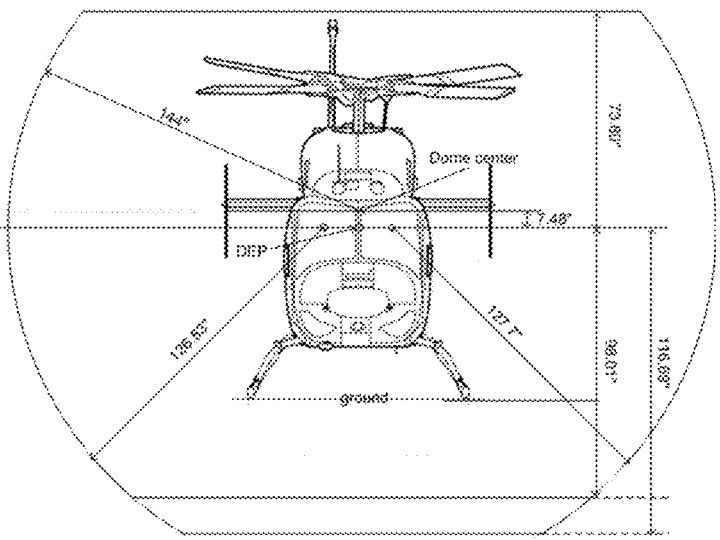
FIG. 9 is a front view of a dome-type simulator with an image of the helicopter of FIG. 8 superimposed to illustrate the difference between the pilot's perception of the ground surface in the simulation as compared with the ground surface in reality.
Figure 10:
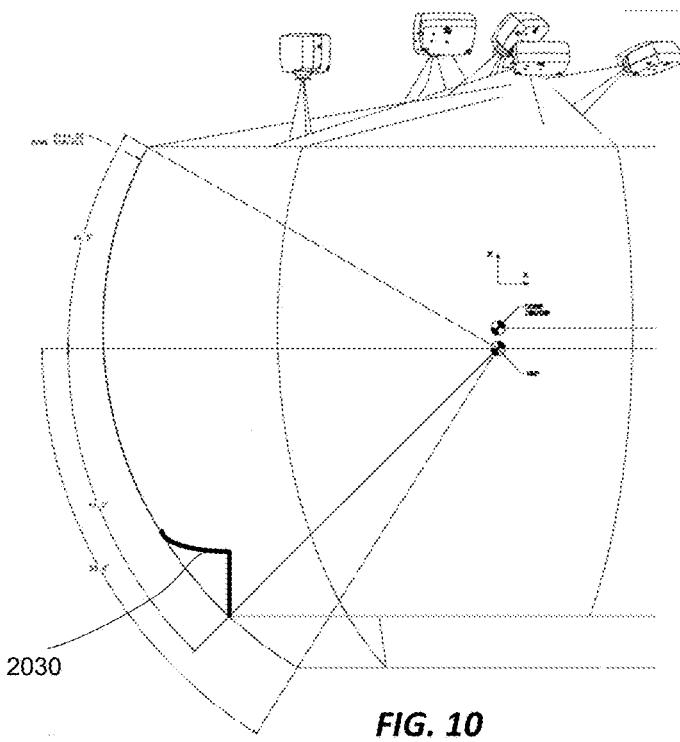
FIG. 10 is a side view of a dome-type simulator for simulating the helicopter of FIG. 8.

FIG. 8 to FIG. 10 depict a specific example of a helicopter simulator where the pilot may not accurately perceive the ground or ground-like images during landing, takeoff and hovering maneuvers due to the vergence-accommodation conflict. FIG. 8 depicts a helicopter on the ground with dimensions showing the actual distances from the pilot's viewpoint to the ground. FIG. 9 depicts a dome-type simulator with the image of the helicopter superimposed to show how the pilot perceives that the distances to the ground are farther away than in reality due to the vergence-accommodation conflict. FIG. 10 shows how the adjusted-projection panel 2030 is mounted to the dome-type simulator to address the vergence-accommodation conflict so that ground or ground-like images appear to the pilot to be closer to reality. The resulting simulation of the helicopter is more accurate when training for takeoff, landing and hovering close to the ground or other ground-like feature like a ship's helipad, flight deck of an aircraft carrier or rooftop helipad.

Another aspect of the disclosure is a kit for addressing a vergence-accommodation conflict in an interactive computer simulation system having a dome defining a general-projection surface defining a general-projection distance. The kit may be used to retrofit an existing dome-type simulator (interactive computer simulation system) or to modify a dome-type simulator that is used for simulating different types of vehicles for which one of the vehicles requires vergence-accommodation conflict resolution. The kit includes at least one displaying panel having an adjusted-projection surface defining an adjusted-projection distance to address the vergence-accommodation conflict relative to the general-projection surface of the dome when simulated ground or ground-like images are displayed on the adjusted-projection surface of the adjusted-projection panel. The kit also includes at least one connector for detachably mounting the adjusted-projection panel onto the dome at an adjusted-projection distance that is smaller than the general-projection distance. The adjusted-projection panel may be a removable panel. In the kit, the removable panel is shaped and sized to be fitted onto the dome between a base and an equatorial plane. It will be appreciated that the kit may include a plurality of adjusted-projection panels presenting multiple adjusted-projection surfaces and respective connectors for detachably the adjusted-projection panels to the dome. In one embodiment, the kits have at least one connector that is adjustable to adjust the adjusted-projection distance and/or to adjust the angle of the adjusted-projection panel to mount it at a variable angle.

The kit may optionally include a dedicated projector for projecting images onto the adjusted-projection surface of the adjusted-projection panel. The kit may include one or more dedicated projectors for displaying images onto the adjusted-displaying surface of the adjusted-projection panel. The kit may optionally include one or more actuators to adjust one or both of the adjusted-projection distance and angle of the adjusted-projection surface of the adjusted-projection panel. Installation of the actuators may require a software update, firmware update or hardware changes to control the actuators. For example, the HAT (height above terrain) from the simulation may be provided to the controller that controls the one or more actuators. In this implementation, a predetermined height when the panel is actuated is defined for the controller. In this imlementation, below a certain height, the position of the panel slowly changes to reduce the distance from the viewpoint until the landing surface is reached. The rate of displacement should be small in order to avoid other issues such as refocusing night-vision goggles.

Figure 11:
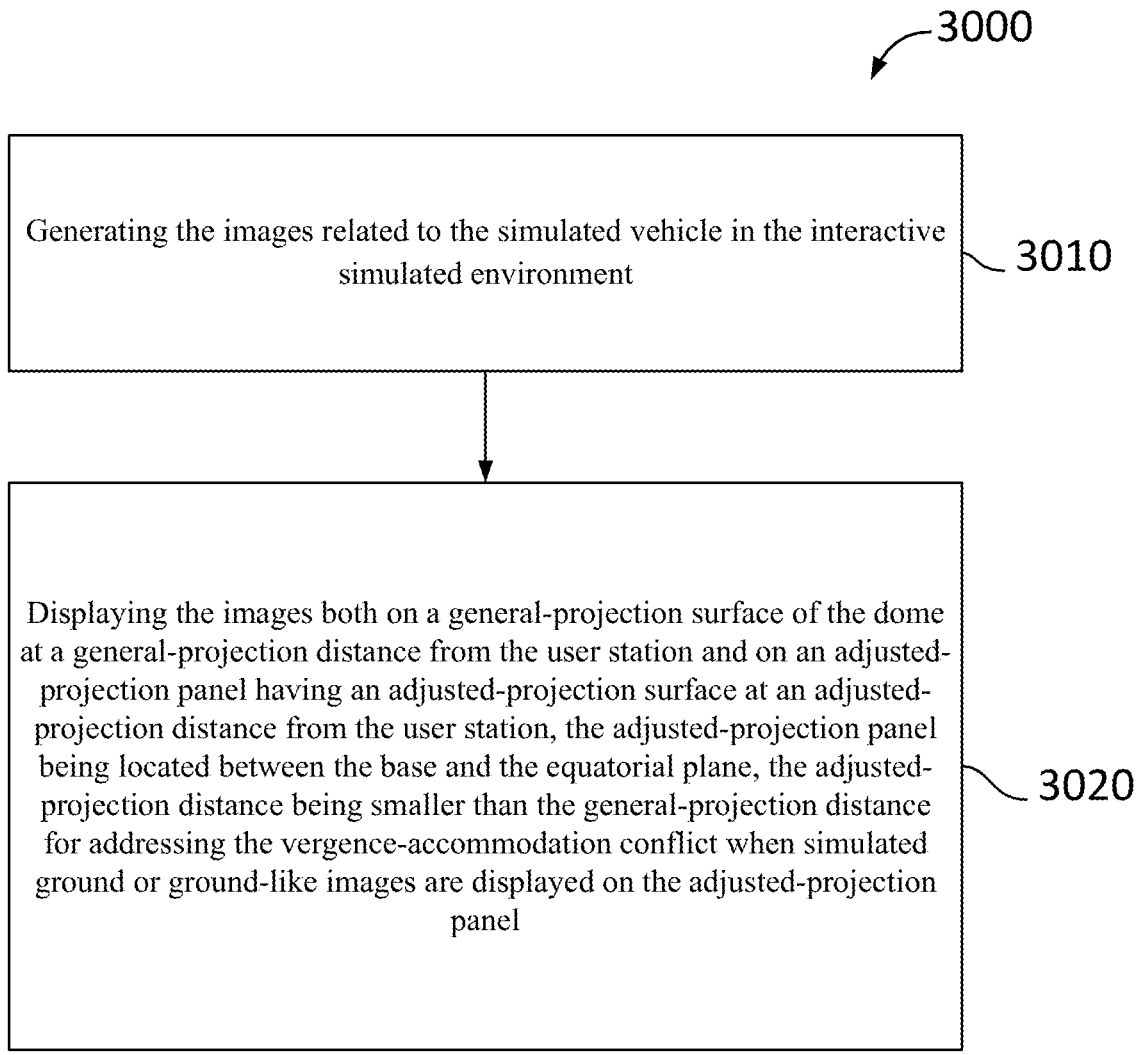
FIG. 11 is a flowchart of a simulation method that uses an adjusted-projection panel to address the vergence-accommodation conflict in accordance with an embodiment of the present invention.

Another aspect of this disclosure is a method of addressing a vergence-accommodation conflict arising from images displayed in a dome-type simulator that simulates a simulated vehicle in an interactive simulated environment, the dome-type simulator having a dome cut by a base below an equatorial plane. In the embodiments of this invention, the method is a computer-implemented method. As depicted in FIG. 11, the method 3000 entails generating 3010 the images related to the simulated vehicle in the interactive simulated environment based on user input received from a user at a user station located within the dome. The method also entails displaying 3020 the images both on a general-projection surface of the dome at a general-projection distance from the user station and on an adjusted-projection surface of the adjusted-projection panel at an adjusted-projection distance from the user station, the adjusted-projection panel being located between the base and the equatorial plane, the adjusted-projection distance being smaller than the general-projection distance for addressing the vergence-accommodation conflict when simulated ground or ground-like images are displayed on the adjusted-projection panel.

In one implementation, the method further includes moving the adjusted-projection panel for varying the adjusted-projection distance. Moving the adjusted-projection panel may involve displacing the adjusted-displacing panel between the adjusted-projection distance and the general-projection distance. Moving the adjusted-projection panel may occur when the simulated vehicle reaches a simulated landing-range distance from a simulated ground or ground-like surface in the interactive simulated environment. Moving the adjusted-displaying panel may occur when the simulated vehicle moves beyond a simulated liftoff-range distance from a simulated ground or ground-like surface in the interactive simulated environment.

In one embodiment, the method entails generating the images by modifying the images programmatically based on a modified adjusted-projection distance. In this embodiment, the processor module modifies the image to take into account the modified adjusted-projection distance. Another aspect of the disclosure is a method of manufacturing a display panel for addressing a vergence accommodation-conflict in images that are projected from an interactive computer simulation of a simulated vehicle in an interactive simulated environment. The simulation is based on user input from a user of the interactive computer simulation system.

Figure 12:
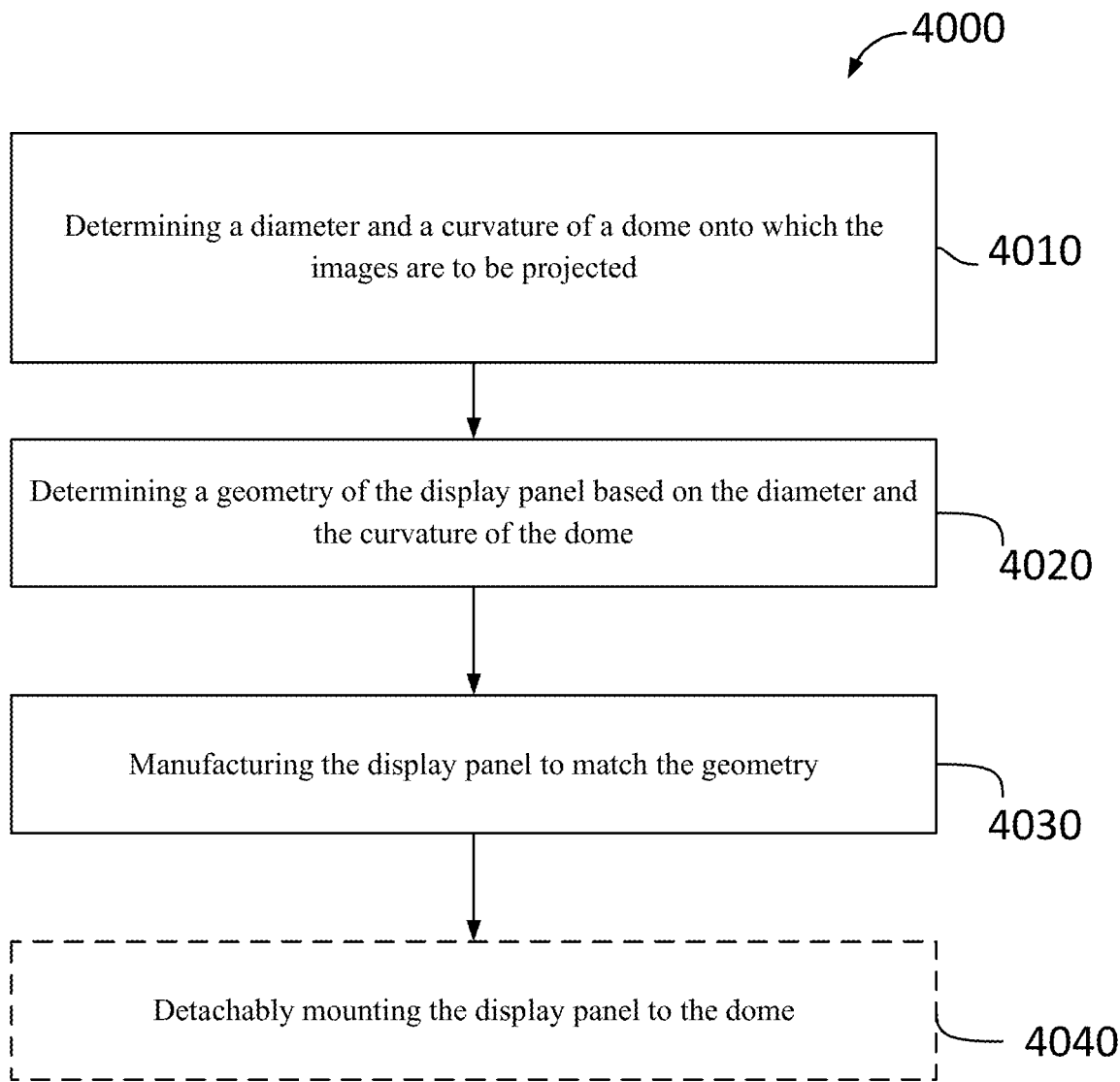
FIG. 12 is a flowchart of a method of manufacturing a removable panel that functions as an adjusted-projection surface in a dome-type simulator in accordance with an embodiment of the present invention.

As depicted in FIG. 12, the method 4000 entails steps, acts or operations of determining 4010 a diameter and a curvature of a dome onto which the images are to be projected, determining 4020 a geometry of the display panel based on the diameter and the curvature of the dome, manufacturing 4030 the display panel based to match the geometry. Once manufactured, the display panel may be detachably mounted 4040 to the dome. The display panel may be made of a material that is the same or highly similar to that of the dome to ensure that the texture and properties of the paint used, like the gain and type of diffusion, are the same to provide continuity of image quality. The extremity, edge or joint between the surfaces of the dome and the panel should be filled and sanded, like the joints between the dome panels, to produce a smooth and seamless visual transition. In some embodiments, the curvature of the horizontal cross-section of the dome against which the panel will abut is determined for the geometry of the panel. The type of aircraft to be simulated may also be a factor in the design of the panel. In one implementation, a plurality of panels is provided, each being designed for a range of cockpits. For example, there may be three panels for three ranges of cockpit sizes having 14-18" buttline (BL), 18-22"BL and 22-26"BL. For the three different cockpit buttlines, a specific radius would be defined along with a different installation height. The addition of the panel should not limit the downward field of view (FOV) so the size and position of the panel when mounted inside the dome should provide a full vertical field of view. The radius of curvature of the panel may be calculated such that the distance from the panel to the eyepoint across the surface of the panel remains substantially constant.

Figure 13:
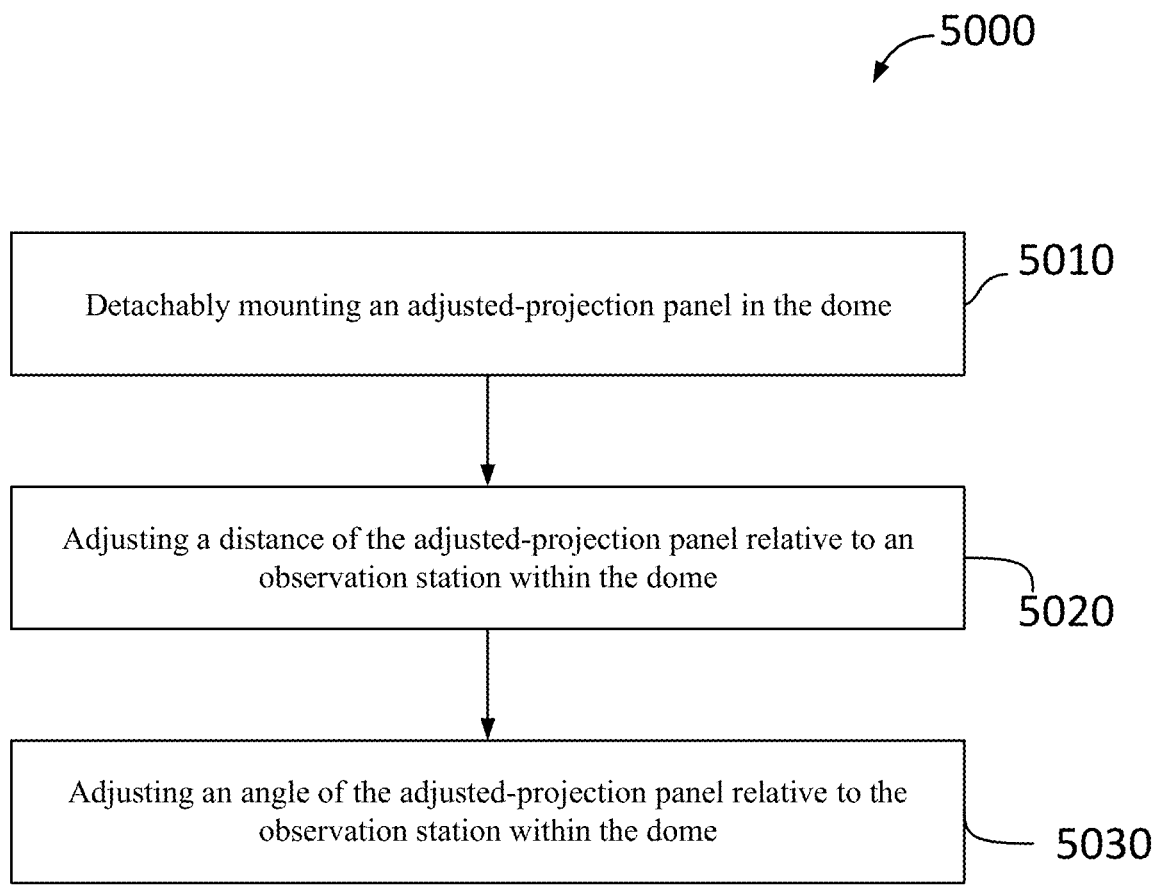
FIG. 13 is a flowchart of a method of configuring a dome-type simulator in accordance with an embodiment of the present invention.

Another aspect of the disclosure is a method of configuring an interactive computer simulation of a simulated vehicle in an interactive simulated environment in which images are projected onto a dome. As depicted in FIG. 13, the method 5000 entails detachably mounting 5010 an adjusted-projection panel in the dome, adjusting 5020 a distance of the adjusted-projection panel relative to an observation station within the dome and/or adjusting an angle of the adjusted-projection panel relative to the observation station within the dome. Configuring the simulation may also entail re-computing the geometry of the image displayed on the panel and the image generator's field of views to compensate for the changing distance to the viewpoint. Configuring the simulation may further involve adjusting the focus of the projector lens or lenses to account for the changing distance.

Some of the foregoing methods can be implemented in hardware, software, firmware or as any suitable combination thereof. That is, if implemented as software, the computer-readable medium comprises instructions in code which when loaded into memory and executed on a processor of a computing device causes the computing device to perform any of the foregoing method steps.

These method steps may be implemented as software, i.e., as coded instructions stored on a computer readable medium which performs the foregoing steps when the computer readable medium is loaded into memory and executed by the microprocessor of the mobile device. A computer readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

For the purposes of interpreting this specification, when referring to elements of various embodiments of the present invention, the articles "a", "an", "the" and "said" are intended to mean that there are one or more of the elements. The terms "comprising", "including", "entailing, "involving" and "having" are intended to be inclusive and open-ended by which it is meant that there may be additional elements other than the explicitly listed elements.

This invention has been described in terms of specific implementations and configurations which are intended to be exemplary only. Persons of ordinary skill in the art will appreciate that many obvious variations, refinements and modifications may be made without departing from the inventive concept(s) presented in this application. The scope of the exclusive right is therefore intended to be limited solely by the appended claims.

The invention claimed is:

1. An interactive computer simulation system comprising:
one or more processors for performing an interactive computer simulation in an interactive simulated environment based on user input and for generating images related to the interactive computer simulation;
a dome for displaying the images, the dome being cut by a base below an equatorial plane of the dome, the images being displayed on the dome at a general-projection distance; and
an adjusted-projection panel having an adjusted-projection surface defining an adjusted-projection distance smaller than the general-projection distance for addressing a vergence-accommodation conflict when simulated ground or ground-like images are displayed.

2. The simulation system of claim 1, wherein the adjusted-projection panel is located above the base and below the equatorial plane.

3. The simulation system of claim 1 further comprising an observation station inside the dome wherein the general-projection distance and the adjusted-projection distance are defined from a position of the observation station, wherein the observation station comprises tangible instruments to receive the user input during the interactive computer simulation.

4. The simulation system of claim 1, wherein the dome has a first curvature and the adjusted-projection surface of the adjusted-projection panel has a second curvature different than the first curvature.

5. The simulation system of claim 1, wherein the adjusted-projection surface is selectively movable in the dome between the adjusted-projection distance and the general-projection distance.

6. The simulation system of claim 1, wherein the adjusted-projection panel is fixed within the dome at the adjusted-projection distance.

7. The simulation system of claim 5, further comprising one or more actuators connected to the adjusted-projection panel for moving the adjusted-projection panel between the general-projection distance and the adjusted-projection distance.

8. The simulation system of claim 7, wherein the one or more actuators move the adjusted-projection panel in response to a command from an Instructor Operating Station (IOS) associated with the simulation system.

9. The simulation system of claim 7, wherein the one or more actuators move the adjusted-projection panel when a simulated vehicle reaches a simulated landing-range distance from a simulated ground or ground-like surface in the interactive simulated environment.

10. The simulation system of claim 9, wherein the one or more actuators move the adjusted-projection panel from the general-projection distance to the adjusted-projection distance as the simulated vehicle reaches the simulated landing-range distance from the simulated ground or ground-like surface in the interactive simulated environment.

11. The simulation system of claim 10, wherein the one or more actuators move the adjusted-projection panel from the adjusted-projection distance to the general-projection distance when the simulated vehicle moves beyond a simulated liftoff-range distance from the simulated ground or ground-like surface in the interactive simulated environment.

12. The simulation system of claim 1, wherein the adjusted-projection panel is between −35° to −58° relative to the equatorial plane.

13. A method for addressing a vergence-accommodation conflict arising from images displayed in a dome-type simulator that simulates a simulated vehicle in an interactive simulated environment, the dome-type simulator having a dome cut by a base below an equatorial plane, the method comprising:
  generating the images related to the simulated vehicle; and
  displaying the images both on a general-projection surface of the dome at a general-projection distance from the user station and on an adjusted-projection panel at an adjusted-projection distance from the user station, the adjusted-projection panel being located between the base and the equatorial plane, the adjusted-projection distance being smaller than the general-projection distance for addressing the vergence-accommodation conflict when simulated ground or ground-like images are displayed on the adjusted-projection panel.

14. The method of claim 13, further comprising moving the adjusted-projection panel for varying the adjusted-projection distance.

15. The method of claim 14, wherein moving the adjusted-displaying surface comprises displacing the adjusted-displacing panel between the adjusted-projection distance and the general-projection distance.

16. The method of claim 14, wherein moving the adjusted-displaying panel occurs when the simulated vehicle reaches a simulated landing-range distance from a simulated ground or ground-like surface in the interactive simulated environment.

17. The method of claim 16, wherein moving the adjusted-displaying panel occurs when the simulated vehicle moves beyond a simulated liftoff-range distance from a simulated ground or ground-like surface in the interactive simulated environment.

18. A kit for addressing a vergence-accommodation conflict in a simulation system having a dome defining a general-projection surface defining a general-projection distance, the kit comprising:
  a display panel having an adjusted-projection surface to address the vergence-accommodation conflict relative to the general-projection surface of the dome when simulated ground or ground-like images are displayed on the adjusted-projection surface of the display panel; and
  a connector for detachably mounting the display panel onto the dome at an adjusted-projection distance that is smaller than the general-projection distance.

19. The kit of claim 18, wherein the display panel is removably mountable onto the dome between a base and an equatorial plane.

20. The kit according to claim 18, wherein the connector is adjustable to adjust the adjusted-projection distance.

21. The kit according to claim 18, further comprising one or more actuators connectable to the display panel to adjust one or both of the adjusted-projection distance and an angle of the adjusted-projection surface of the display panel.

22. A method of manufacturing a display panel for addressing a vergence accommodation-conflict in images that are projected from an interactive computer simulation of a simulated vehicle in an interactive simulated environment based on user input from a user of the simulation system, the method comprising:
  determining a diameter and a curvature of a dome onto which the images are to be projected;
  determining a geometry of the display panel based on the diameter and the curvature of the dome, wherein the geometry of display panel compensates for the vergence accommodation conflict arising when simulates ground or ground-like images are displayed; and
  manufacturing the display panel to match the geometry.

23. The method of claim 22 further comprising determining a material of the dome and a coating on an inner surface of the dome onto which the images are to be projected, wherein the manufacturing the display panel to match the geometry is performed using the determined material and coating.

24. A method of configuring an interactive computer simulation of a simulated vehicle in an interactive simulated environment in which images are projected onto a dome, the method comprising:
  detachably mounting an adjusted-projection panel having an adjusted-projection surface in the dome wherein the adjusted-projection panel compensates for the vergence accommodation conflict arising when simulated ground or ground-like images are displayed.

25. The method of claim 24 further comprising adjusting a distance of the adjusted-projection panel relative to an observation station within the dome.

* * * * *